United States Patent
Tiwari et al.

(10) Patent No.: US 9,517,521 B2
(45) Date of Patent: Dec. 13, 2016

(54) METHOD FOR REPAIRING COMPONENT

(71) Applicants: Mayank Tiwari, Bangalore (IN); Laurent Cretegny, Niskayuna, NY (US); Yong Liu, Shanghai (CN); Bala Srinivasan Parthasarathy, Bangalore (IN); Ravi Agrawal, Bangalore (IN); Yong Wu, Shanghai (CN)

(72) Inventors: Mayank Tiwari, Bangalore (IN); Laurent Cretegny, Niskayuna, NY (US); Yong Liu, Shanghai (CN); Bala Srinivasan Parthasarathy, Bangalore (IN); Ravi Agrawal, Bangalore (IN); Yong Wu, Shanghai (CN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 443 days.

(21) Appl. No.: 13/934,541

(22) Filed: Jul. 3, 2013

(65) Prior Publication Data

US 2014/0008330 A1 Jan. 9, 2014

(30) Foreign Application Priority Data

Jul. 5, 2012 (CN) .......................... 2012 1 0232351

(51) Int. Cl.
*B23K 9/04* (2006.01)
*B23P 6/00* (2006.01)
*C23C 24/10* (2006.01)

(52) U.S. Cl.
CPC . *B23K 9/04* (2013.01); *B23P 6/00* (2013.01); *C23C 24/106* (2013.01)

(58) Field of Classification Search
CPC ......... B23K 9/0061; B23K 9/004; B23K 9/18; B23K 25/00; B23K 25/005

(Continued)

(56) References Cited

U.S. PATENT DOCUMENTS 3,415,975 A * 12/1968 Johnson ....................... 219/73.2
4,798,474 A 1/1989 Daily
(Continued)

FOREIGN PATENT DOCUMENTS

CN 1775453 A 5/2006
CN 1883872 A 12/2006
(Continued)

OTHER PUBLICATIONS

James et al., "Electro-spark deposition", Advanced Materials and Processes, vol. No. 161, Issue No. 3, pp. 35-37, Mar. 2003.

(Continued)

*Primary Examiner* — Brian Jennison
(74) *Attorney, Agent, or Firm* — GE Global Patent Operation; Douglas D. Zhang

(57) ABSTRACT

A method for repairing a component is provided. The method comprises: tracing an electrode across a defect/damage on the component at a preselected distance from the component; feeding a first metal powder and a second metal powder into a discharging gap between the electrode and the component; controlling feed rates of the first and second metal powders separately; and electro-spark depositing the first and second metal powders to the component to form a hybrid metal coating. The first metal powder comprises a first metal or alloy with a Vickers hardness rating of about 70-200% of the Vickers hardness rating of the component. The second metal powder comprises a second metal or alloy having lubricating/anti-corrosion properties.

20 Claims, 2 Drawing Sheets

(58) Field of Classification Search
USPC .............. 219/73.11, 73.2, 73.21, 76.1, 69.11, 219/76.14
See application file for complete search history.

(56) References Cited

U.S. PATENT DOCUMENTS

| | | | |
|---|---|---|---|
| 5,206,059 A * | 4/1993 | Marantz | 427/449 |
| 6,245,390 B1 * | 6/2001 | Baranovski et al. | 427/449 |
| 6,336,950 B1 | 1/2002 | Koizumi et al. | |
| 7,026,568 B2 | 4/2006 | Guerrina | |
| 7,641,744 B2 | 1/2010 | Winkelmann | |
| 7,759,294 B2 | 7/2010 | Devlin et al. | |
| 8,162,601 B2 | 4/2012 | Ochiai et al. | |
| 2004/0140292 A1 | 7/2004 | Kelley et al. | |
| 2005/0014597 A1 | 1/2005 | Michaud et al. | |
| 2005/0067466 A1 * | 3/2005 | Boegli | B23K 9/04 228/119 |
| 2005/0090409 A1 | 4/2005 | Devlin et al. | |
| 2005/0164610 A1 | 7/2005 | Michaud et al. | |
| 2006/0035068 A1 | 2/2006 | Ochiai et al. | |
| 2009/0056096 A1 | 3/2009 | Hixson et al. | |
| 2009/0093384 A1 | 4/2009 | Ward et al. | |
| 2010/0086398 A1 | 4/2010 | Ochiai et al. | |
| 2010/0236067 A1 * | 9/2010 | Hu | B23K 9/044 29/889.1 |
| 2010/0331139 A1 | 12/2010 | Mccune | |
| 2011/0036721 A1 | 2/2011 | Kobayashi | |
| 2012/0193329 A1 | 8/2012 | Liu et al. | |

FOREIGN PATENT DOCUMENTS

| | | |
|---|---|---|
| CN | 101146930 A | 3/2008 |
| CN | 102528376 A | 7/2012 |
| EP | 1921333 A1 | 5/2008 |
| GB | 2215250 A | 9/1989 |
| JP | 9100882 A | 4/1997 |

OTHER PUBLICATIONS

Unofficial English Translation of Chinese Office Action issued in connection with corresponding CN Application No. 201210232351.6 on Apr. 30, 2015.

* cited by examiner

METHOD FOR REPAIRING COMPONENT

BACKGROUND

The present invention relates generally to a method for repairing components, and, more specifically, to a method capable of depositing a hybrid metal coating to repair, to improve and to extend the service life of components.

It is well known that mechanical components, for example, sliding components such as piston-cylinders and gate valves, or rolling-sliding components such as cams and gears, undergo micro-pitting and cracking during service due to material issues and/or prolonged running even in a well-lubricated running condition. The damages happen essentially due to the high stresses at the mating interface, for example, at tooth of gears. Restoring the mating interfaces of the damaged components become an important issue and it is a challenge to get them back to operable condition with appropriate repair technique, as it may be expensive to replace those damaged components. Moreover, in some circumstances, in order to extend the life of a component, it might be desired to further treat the repaired surface of the component to improve the tribological and/or corrosion performance.

Therefore, it is desired to provide an effective way to repair/restore components, and further improve the tribological and/or corrosion performance of the components and extend the service life of the components.

BRIEF DESCRIPTION

One aspect of the present disclosure provides a method for repairing a component. The method comprises: tracing an electrode across a defect/damage on the component at a preselected distance from the component; feeding a first metal powder and a second metal powder into a discharging gap between the electrode and the component; controlling feed rates of the first and second metal powders separately; and electro-spark depositing the first and second metal powders to the component to form a hybrid metal coating. The first metal powder comprises a first metal or alloy with a Vickers hardness rating of about 70-200% of the Vickers hardness rating of the base component. The second metal powder comprises a second metal or alloy having lubricating/anti-corrosion properties.

BRIEF DESCRIPTION OF THE DRAWINGS

The above and other aspects, features, and advantages of the present disclosure will become more apparent in light of the subsequent detailed description when taken in conjunction with the accompanying drawings in which.

DETAILED DESCRIPTION

Figure 1:
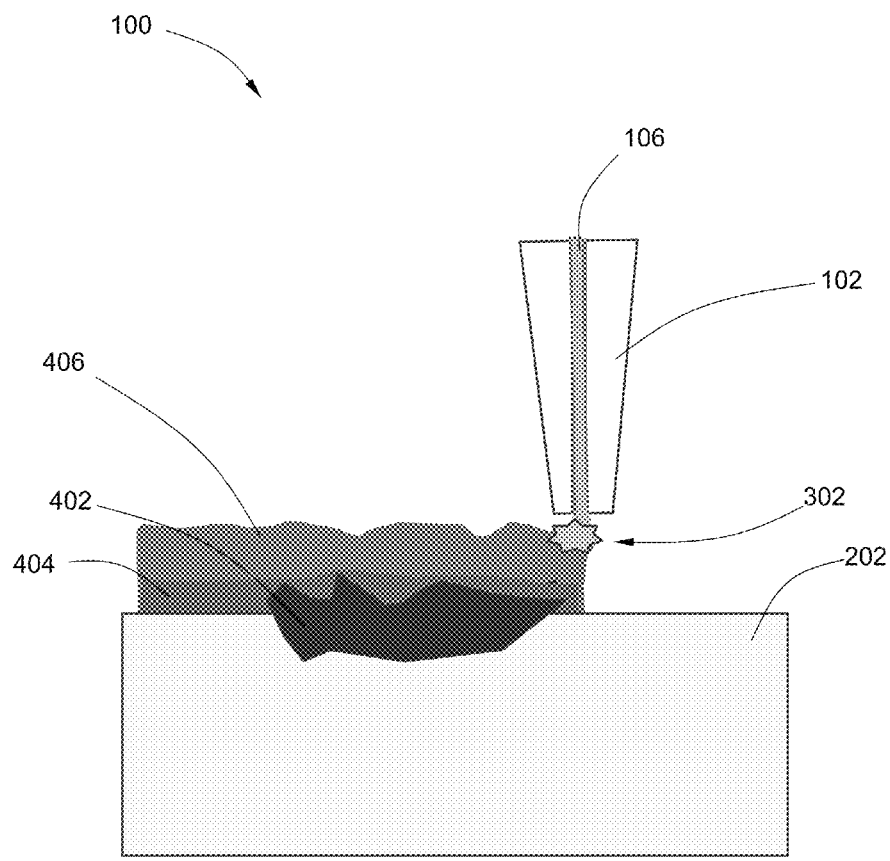
FIG. 1 is a schematic diagram of an exemplary electro-spark deposition system in accordance with one embodiment of the present disclosure.

Embodiments of the present disclosure will be described with reference to the accompanying drawings. In the subsequent description, well-known functions or constructions are not described in detail to avoid obscuring the disclosure in unnecessary detail.

Approximating language, as used herein throughout the specification and claims, may be applied to modify any quantitative representation that could permissibly vary without resulting in a change in the basic function to which it is related. Accordingly, a value modified by a term or terms, such as "about," is not to be limited to the precise value specified. In certain embodiments, the term "about" means plus or minus ten percent (10%) of a value. For example, "about 100" would refer to any number between 90 and 110. Additionally, when using an expression of "about a first value—a second value," the about is intended to modify both values. In some instances, the approximating language may correspond to the precision of an instrument for measuring the value or values.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless defined otherwise, technical and scientific terms used herein have the same meaning as is commonly understood by one of skill in the art to which this invention belongs. The terms "first," "second," and the like, as used herein do not denote any order, quantity, or importance, but rather are used to distinguish one element from another. Also, the terms "a" and "an" do not denote a limitation of quantity, but rather denote the presence of at least one of the referenced items.

In one aspect of the present disclosure, a method for repairing a component is provided. The method comprises: tracing an electrode across a defect/damage on the component at a preselected distance from the component; feeding a first metal powder and a second metal powder into a discharging gap between the electrode and the component; controlling feed rates of the first and second metal powders separately; and electro-spark depositing the first and second metal powders to the component to form a hybrid metal coating. The first metal powder comprises a first metal/alloy with a Vickers hardness rating of about 70-200% of the Vickers hardness rating of the component. The second metal powder comprises a second metal/alloy having lubricating/anti-corrosion properties.

In certain embodiments, the method further comprises a step of examining a surface of the component to identify the location of the defect/damage before tracing the electrode across the defect/damage.

In certain embodiments, the first metal powder is primarily located within interstitial spaces of the defect/damage as a first layer and the second metal powder is deposited as a surface layer. The thickness of the first layer depends on the size of the defect/damage needed to be repaired. In one embodiment, the first layer has a thickness of about 30 microns. In one embodiment, the surface layer has a thickness of about 10 microns or less than about 10 microns.

In certain embodiments, a transition layer is deposited between the first layer and the surface layer.

In certain embodiments, the transition layer is a graded layer with a compositional gradient of the first and/or second metal powder(s). For example, in certain embodiments, by feeding the first and second metal powders into the discharging gap at variable feed rates and co-depositing them onto the first layer and adjusting the relative feed rates of the first and second metal powders, a continuous compositional gradient can be achieved in the transition layer. The compositional gradient may follow a linear, exponential or variable function. In a specific embodiment, the hybrid metal coating is formed by depositing the first metal powder to the interstitial spaces of defect/damage to form a first layer; depositing the first and second metal powders onto the first layer to form a graded transition layer, while increasing the feed rate of the second metal powder and/or reducing the feed rate of the first metal powder; and depositing the second metal powder to the transition layer to form a surface layer. In the graded transition layer, the content of the first metal/alloy gradually decreases whereas the content of the second metal/alloy gradually increases along a direction from the first layer to the surface layer.

Alternatively, in certain embodiments, the transition layer is formed by a material adhesion bond compatible with both the first layer and surface layer but different from the first and second metal powders. In one embodiment, the transition layer is formed by a metal powder comprising a metal/alloy which is adhesion bond compatible with, but different from both the first and second metals/alloys. For example, in a specific embodiment, the first metal/alloy is steel, the second metal/alloy is silver, and a metal powder comprising copper is deposited to form the transition layer.

The method of the present disclosure is capable of depositing a hybrid metal coating to repair localized defect/damages and improve the tribological and corrosion performance of the whole surface of the component. The first metal powder is deposited as the first layer to repair the defect/damage on the component, and the second metal powder is deposited as a lubricating or corrosion resistant surface layer. The transition layer is optionally deposited to enhance adhesion between the first layer and the lubricating surface layer. Due to the ability of electro-spark deposition to form metallurgical bonding of coating to a substrate, said method enables metallurgical bonding either between the hybrid metal coating and the component, or between different layers of the hybrid metal coating, which ensures adhesion of the hybrid metal coating to the component.

The first metal/alloy with a Vickers hardness rating of about 70-200% of the Vickers hardness rating of the component is able to adheres well to the component. In certain embodiments, the first metal/alloy has a Vickers hardness rating of about 90-200%, or preferably about 95-200%, or more preferably about 95-150%, or more preferably about 100-120% of the Vickers hardness rating of the component. Vickers hardness is a measure of the hardness of the material calculated from the size of an impression produced under load and may be measured using standard test methods such as ISO 6507-1,2, and 3 (International Organization for Standardization). In one embodiment, the first metal/alloy has a composition the same with that of the component.

Depending on what material the component to be repaired is made from, several non-limiting examples of the first metal/alloy may comprise SiC, $Al_2O_3$, WC, $Cr_3C_2$ and other materials or combination of materials capable of improving the hardness and wear resistance. In certain embodiments, the hardness of the first layer ranges from about 200 HV to 800 HV.

"Metal/alloy having lubricating properties" used herein refers to a metal or alloy which can be used as the constituents of sliding or rolling-sliding surfaces. In certain embodiments, the second metal/alloy having lubricating properties is a metal/alloy which is able to provide a friction coefficient value of about 0.05-0.1 under sliding or rolling-sliding boundary lubrication conditions at a temperature less than about 100° C. In certain specific embodiment, the second metal/alloy comprises copper, silver, tin, lead, zinc or a combination thereof.

"Metal/alloy having anti-corrosion properties" used herein refers to a metal or alloy which can be used as the constituents of corrosion resistant surfaces. In certain embodiments, the second metal/alloy having anti-corrosion properties is a metal/alloy which is more corrosion resistant than the base component, such that the surface layer constituted with the second metal/alloy is able to provide an improved corrosion resistance to the component. In certain specific embodiment, the second metal/alloy comprises nickel based alloy.

In certain embodiments, the method is carried out by a system as illustrated in FIG. 1. As shown in FIG. 1, the system 100 comprises an electrode 102 capable of tracing across a component 202 at a preselected distance and depositing powder material, which is introduced into the discharging gap 302 between the electrode and the component, onto the component 202. By applying a pulsed direct current to the electrode 102, making the component 202 as cathode, the powder material introduced into the discharging gap 302 can be deposited at desired locations on the component 202 using a very low heat input. The particles of the powder material such as a metal powder fed in the discharging gap 302 become energized and come close to each other in the discharging gap 302. The subsequent interlocking between the particles takes place due to variation in their shape and size. The powder particles in the discharging gap 302 arrange themselves in the form of chain and act as series particle electrodes. The chain formation helps in bridging the discharging gap 302. Due to the bridging effect of the powder particles, effective material deposition may be realized even at an increased discharging gap. Therefore, the component repairing process can be operated in a non-contact condition by tracing the electrode 102 across the component 202 at a preselected distance. Moreover, by depositing powder material introduced in the discharging gap onto the component, instead of depositing material from the electrode to the component, said system is capable of substantially reducing or even eliminating consumption of the electrode. The use of a non-consumable electrode facilitates the employment of any filler material composition that is needed for deposition on the components to be repaired.

The system further comprises at least one powder feeding channel 106 for introducing the powder material into the discharging gap 302. The powder feeding channel of the powder feeding device may be configured within or outside the electrode and may comprise any structurally suitable type of channel with several examples including, but not limited to, holes, slots, and annular grooves. In certain embodiments, the powder feeding channel outside the electrode at least partially surrounds the electrode. In a specific embodiment, the powder feeding channel outside the electrode comprises an annular groove surrounding the electrode. In another specific embodiment, the powder feeding channel outside the electrode comprises a plurality of channels that substantially surrounds the electrode. The powder feeding channel outside the electrode may be provided within one or more spray volumes such as nozzles, granular spreaders, etc.

In the illustrated embodiment, the system 100 comprises an internal powder feeding channel 106 within the electrode 102. The first and second metal powders are fed into the discharging gap through the internal powder feeding channel 106. The first and second metal powders may be introduced into the internal powder feeding channel 106 within the electrode 102 via two powder feeders (not shown) separately, such that it is able to control the composition of the powder fed into the discharging gap by controlling the relative feed rates of the first and second metal powders in the two powder feeders respectively. For example, as illustrated in FIG. 1, by controlling the feed rate of the second metal powder in its powder feeder at zero, only the first metal powder is introduced into the channel 106 and deposited onto the component 202 to form a first layer 402. Then, by gradually increasing the feed rate of the second metal powder and decreasing the feed rate of the first metal powder, a graded transition layer 404 is formed on the first layer 402. Then, by controlling the feed rate of the feed rate of the first metal powder at zero, only the second metal powder is introduced into the channel 106 and deposited onto the transition layer 404 to form a surface layer 406.

Alternatively or additionally, the first and second metal powders may be fed into the discharging gap through external powder feeding channels outside the electrode. For example, in one embodiment, the first and second metal powders may be fed into the discharging gap through external channels provided by two separately controllable powder nozzles.

The powder material may be fed into the discharging gap in a dry or wet condition. That is to say, the powder material may be fed into the discharging gap in a form of dry powder or powder-liquid mixture. The term "dry" or "dry powder" as used herein, means that there is no liquid intentionally added to the powder material, but it should not exclude powder material affected by exposure to atmospheric humidity. In certain embodiments, "dry powder" means powder material that includes less than about 10% by weight of moisture content. In a dry condition, dry powder is usually carried by a carrier gas. The carrier gas may be either reactive gases, such as oxygen, or inert gases, such as argon. In certain embodiments, the first and second metal powders are fed into the discharging gap by a carrier gas in a dry condition.

The repairing method can be operated in open air environment, which greatly facilitates in-situ component repair process.

Example:

A system with a hollow electrode, like that illustrated in FIG. 1, was used to deposit a 34CrNiMo6 steel powder as a first layer onto a surface of a component made from 34CrNiMo6 steel, and then deposit a copper powder onto the first layer to form a transition layer, and then a deposit silver powder onto the transition layer to form a lubricating surface layer.

In a first step, a voltage of about 65V was applied across the electrode and the component to allow for material deposition. The electrode was used as anode and the component to be repaired was used as cathode. By tracing the electrode across the component and feeding 34CrNiMo6 steel powder into the discharging gap between the electrode and the component via a carrier gas, the 34CrNiMo6 steel powder was deposited onto the component as a first layer. The tracing/scanning speed of the electrode was about 1 mm/s. The powder feed rate was about 1 g/min, and the flow rate of the carrier gas was about 8 L/min.

Afterwards, by tracing the electrode across the first layer on the component and feeding copper powder into the discharging gap between the electrode and the component via a carrier gas, the copper powder was deposited onto the first layer on the component as a transition layer. The tracing/scanning speed of the electrode was about 1 mm/s. The powder feed rate was about 1.7 g/min, and the flow rate of the carrier gas was about 8 L/min.

By tracing the electrode across the transition layer on the component and feeding silver powder into the discharging gap between the electrode and the component via a carrier gas, the silver powder was deposited onto the transition layer on the component as a lubricating surface layer. The tracing/scanning speed of the electrode was about 1 mm/s. The powder feed rate was about 0.75 g/min, and the flow rate of the carrier gas was about 8 L/min.

Figure 2:
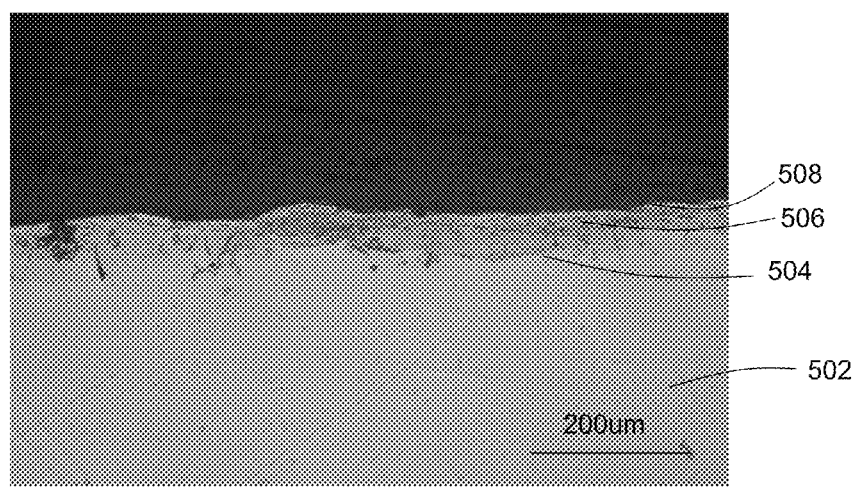
FIG. 2 is a photograph showing a cross section of a component deposited with a hybrid metal coating comprising a first layer of 34CrNiMo6 steel, a transition layer of copper and a surface layer of silver, in accordance with one embodiment of the present disclosure.

FIG. 2 is a photograph showing a cross section of the component. As shown in FIG. 2, the component 502 has been deposited with a hybrid metal coating, which comprises a first layer 504 of 34CrNiMo6 steel, a transition layer 506 of copper and a surface layer 508 of silver. The 34CrNiMo6 steel layer 504, the copper layer 506 and the silver layer 508 are well metallurgical bonded to each other and to the component 502.

The invention may be embodied in other specific forms without departing from the spirit or essential characteristics thereof. The foregoing embodiments are therefore to be considered in all respects as illustrative rather than limiting on the invention described herein. The scope of embodiments of the invention is thus indicated by the appended claims rather than by the foregoing description, and all changes that come within the meaning and range of equivalency of the claims are therefore intended to be embraced therein.

The invention claimed is:

1. A method for repairing a component, comprising:
    tracing a non-consumable electrode across a defect/damage on the component at a preselected distance from the component;
    feeding a first metal powder and a second metal powder into a discharging gap between the electrode and the component, wherein the first metal powder comprises a first metal or alloy with a Vickers hardness rating of about 70-200% of the Vickers hardness rating of the component and wherein the second metal powder comprises a second metal or alloy having lubricating/anti-corrosion properties;
    controlling feed rates of the first and second metal powders separately;
    micro-spark depositing the first metal powder to the component to form a first metal coating layer from the first metal powder; and
    tracing the electrode back over the first metal coating layer and micro-spark depositing the second metal powder over the first metal coating layer to form a second metal coating from the second metal powder overlying the first metal coating layer, the first and second metal coating layers defining a hybrid metal coating.

2. The method of claim 1, further comprises: examining a surface of the component to identify the location of the defect/damage before tracing the electrode across the defect/damage.

3. The method of claim 1, wherein the first metal powder is primarily located within interstitial spaces of the defect/damage as the first metal coating layer and the second metal powder is deposited as a surface layer above the first metal coating layer.

4. The method of claim 3, wherein the first metal coating layer has a thickness of about 30 microns.

5. The method of claim 3, wherein the surface layer has a thickness of about 10 microns.

6. The method of claim 3, wherein a transition layer is deposited between the first metal coating layer and the surface layer.

7. The method of claim 6, wherein the transition layer is a graded layer with a compositional gradient of the first metal powder and the second metal powder.

8. The method of claim 6, wherein the transition layer is a graded layer, in which the content of the first metal or alloy decreases whereas the content of the second metal or alloy increases along a direction from the first metal coating layer to the surface layer.

9. The method of claim 6, wherein the hybrid metal coating is formed by:
   depositing the first metal powder to the interstitial spaces of the defect/damage to form the first metal coating layer;
   depositing the first and second metal powders onto the first metal coating layer to form a graded transition layer, while increasing the feed rate of the second metal powder and reducing the feed rate of the first metal powder; and
   depositing the second metal powder to the transition layer to form the surface layer.

10. The method of claim 6, wherein the transition layer is formed by a metal powder comprising a metal or alloy adhesion bond compatible with but different from both the first metal or alloy and the second metal or alloy.

11. The method of claim 1, wherein the first metal or alloy has a Vickers hardness rating of about 90-200% of the Vickers hardness rating of the component.

12. The method of claim 1, wherein the first metal or alloy has a Brinell hardness rating of about 95-200% of the Vickers hardness rating of the component.

13. The method of claim 1, wherein the first metal or alloy has a Brinell hardness rating of about 95-150% of the Vickers hardness rating of the component.

14. The method of claim 1, wherein the first metal or alloy has a composition the same with that of the component.

15. The method of claim 1, wherein the second metal or alloy is able to provide a friction coefficient value of about 0.05-0.1 under sliding or rolling-sliding boundary lubrication conditions at a temperature less than about 100° C.

16. The method of claim 1, wherein the second metal or alloy is more corrosion resistant than the base component.

17. The method of claim 1, wherein the second metal or alloy comprises copper, silver, tin, zinc, lead, nickel based alloy, or a combination thereof.

18. The method of claim 1, wherein the first and second metal powders are fed into the discharging gap through a powder feeding channel within the electrode.

19. The method of claim 18, wherein the first and second metal powders are introduced into the powder feeding channel via two powder feeders separately.

20. The method of claim 1, wherein the first and second metal powders are fed into the discharging gap through two nozzles separately.

* * * * *